United States Patent
Cook et al.

(10) Patent No.: US 8,658,056 B1
(45) Date of Patent: Feb. 25, 2014

(54) HARVESTING SINGLE DOMAIN NANOPARTICLES AND THEIR APPLICATIONS

(75) Inventors: Gary Cook, Beavercreek, OH (US); Dean R. Evans, Beavercreek, OH (US); Sergey Basun, Beavercreek, OH (US); Victor Y. Reshetnyak, Kyiv (UA)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 218 days.

(21) Appl. No.: 12/903,331

(22) Filed: Oct. 13, 2010

Related U.S. Application Data

(60) Provisional application No. 61/331,570, filed on May 5, 2010.

(51) Int. Cl.
*C09K 19/54* (2006.01)
*C09K 19/52* (2006.01)

(52) U.S. Cl.
USPC .................. 252/299.01; 252/299.5; 977/773; 977/952

(58) Field of Classification Search
USPC .................. 977/773, 952; 252/299.01, 299.5
See application file for complete search history.

(56) References Cited

U.S. PATENT DOCUMENTS

| | | | |
|---|---|---|---|
| 4,054,513 A | 10/1977 | Windle | |
| 4,110,222 A | 8/1978 | Watson | |
| 4,172,028 A | 10/1979 | Dunn | |
| 4,261,815 A | 4/1981 | Kelland | |
| 4,444,659 A | 4/1984 | Beelitz et al. | |
| 4,454,016 A * | 6/1984 | Rabinowitz et al. | 204/666 |
| 4,602,997 A | 7/1986 | Sandulyak et al. | |
| 4,737,268 A | 4/1988 | Giddings | |
| 4,797,201 A | 1/1989 | Kuppers et al. | |
| 5,076,914 A | 12/1991 | Garaschenko et al. | |
| 5,169,006 A | 12/1992 | Stelzer | |
| 5,176,260 A | 1/1993 | Oder | |
| 5,224,604 A | 7/1993 | Duczmal et al. | |
| 5,454,472 A | 10/1995 | Benecke et al. | |
| 5,503,723 A | 4/1996 | Ruddy et al. | |
| 5,549,973 A | 8/1996 | Majetich et al. | |
| 5,868,257 A | 2/1999 | Stadtmuller | |
| 5,879,715 A | 3/1999 | Higgins et al. | |
| 5,909,813 A | 6/1999 | Stelzer | |
| 5,993,631 A | 11/1999 | Parton et al. | |
| 6,190,563 B1 | 2/2001 | Bambic | |
| 6,310,309 B1 | 10/2001 | Ager et al. | |
| 6,329,623 B1 | 12/2001 | Yan et al. | |
| 6,467,630 B1 | 10/2002 | Zborowski et al. | |
| 6,540,088 B2 | 4/2003 | Oder et al. | |
| 6,689,190 B2 | 2/2004 | Pozarnsky et al. | |
| 6,723,606 B2 | 4/2004 | Flagan et al. | |
| 6,727,451 B1 | 4/2004 | Fuhr et al. | |
| 6,739,456 B2 | 5/2004 | Svoronos et al. | |
| 6,789,679 B2 | 9/2004 | Abrarov et al. | |

(Continued)

FOREIGN PATENT DOCUMENTS

WO    WO 2007093928 A1 * 8/2007

*Primary Examiner* — Shean C Wu
(74) *Attorney, Agent, or Firm* — AFMCLO/JAZ; Chastity Whitaker

(57) ABSTRACT

Methods are disclosed for separating and harvesting very small single domain ferroelectric nanoparticles by application of a non-uniform electric or magnetic field gradient. The disclosed methods enable collection of nanoparticles with permanent strong dipole moments for use in a wide variety of applications with greatly improved results.

41 Claims, 5 Drawing Sheets

(56) References Cited

U.S. PATENT DOCUMENTS

| | | |
|---|---|---|
| 6,797,908 B2 | 9/2004 | Yan et al. |
| 6,846,474 B2 | 1/2005 | Nayfeh et al. |
| 6,851,557 B1 | 2/2005 | Svoboda |
| 6,905,029 B2 | 6/2005 | Flagan |
| 6,949,715 B2 | 9/2005 | Kelly |
| 6,994,219 B2 | 2/2006 | Roth et al. |
| 7,073,668 B2 | 7/2006 | Alford et al. |
| 7,105,145 B2 | 9/2006 | Seol et al. |
| 7,161,107 B2 | 1/2007 | Krupke et al. |
| 7,178,747 B2 | 2/2007 | Yadav et al. |
| 7,316,320 B2 | 1/2008 | Sibbett et al. |
| 2002/0011652 A1 | 1/2002 | Pogge |
| 2010/0259259 A1* | 10/2010 | Zahn et al. .................. 324/309 |

\* cited by examiner

HARVESTING SINGLE DOMAIN NANOPARTICLES AND THEIR APPLICATIONS

CROSS REFERENCE TO RELATED APPLICATIONS

This application claims benefit of priority from U.S. Provisional Application Ser. No. 61/331,570, which was filed at the United States Patent and Trademark Office on May 5, 2010.

RIGHTS OF THE GOVERNMENT

The invention described herein may be manufactured and used by or for the Government of the United States for all governmental purposes without the payment of any royalty.

TECHNICAL FIELD

This disclosure relates generally to methods of harvesting nanoparticles and associated apparatuses for use in those methods. More particularly, it relates to methods of harvesting ferroic nanoparticles, such as single domain ferroic nanoparticles and the use of such selectively harvested particles in a wide variety of applications.

BACKGROUND

It has become common practice in current liquid crystal research to add small concentrations (usually in the range of 0.01 weight % to 5.0 weight %) of nanoparticles of ferroelectric material to a liquid crystal medium. Typical ferroelectric nanoparticle materials may comprise barium titanate ($BaTiO_3$), lithium niobate ($LiNbO_3$), potassium niobate ($KNbO_3$), strontium barium niobate (SBN), potassium sodium strontium barium niobate (KNSBN), spark plasma sintering (SPS), gallium arsenide (GaAs), indium phosphide (InP), and the like. The addition of such materials has been shown to reduce the Freedericksz transition voltage, which measures how much voltage is required to drive a given liquid crystal device, and/or to raise the nematic-isotropic phase transition temperature, thereby increasing the useable temperature range of a liquid crystal-based device. Additional benefits include improved speed of response, higher frequency operation, reduced current leakage, and wider field of view. For example, studies of liquid crystal colloids doped with ferroic nanoparticles have become a topical subject in which the additions of ferroelectric and ferromagnetic nanoparticles have variously been reported to moderate the phase transition temperatures, influence the dielectric anisotropy, affect the electric field induced liquid crystal reorientation (Freedericksz transition), and increase optical diffraction or beam coupling efficiencies. The addition of ferroelectric nanoparticles is therefore of great advantage to many liquid crystal materials. The positive benefits obtained through this addition depend explicitly on the ferroelectric properties of the nanometric material. The production of ferroelectric nanoparticles is, however, rather haphazard and produces materials with uncertain outcomes when added to liquid crystals. Production methods range from chemical sedimentation, to flame photolysis, to mechanical grinding of bulk material. Regardless of the production method, preservation of the ferroelectric property of a strong spontaneous polarization in the prepared nanoparticles is of utmost importance for most applications.

The permanent spontaneous polarization of these materials increases overall liquid crystal sensitivity to externally applied electric fields. The influence of ferroelectric nanoparticles on their environment depends intimately on the net strength of the particle dipole moment arising from the ferroelectric domain spontaneous polarizations. The net dipole moment for any given ferroelectric nanoparticle is maximized when the structure becomes single domain. Unfortunately, common production methods, such as chemical precipitation and spark plasma production, cannot ensure that the resulting nanoparticles have strong ferroelectric dipole moments or that the material is even ferroelectric for smaller size particles, because of the size dependence of the ferroelectric effect. Development of reliable methods to control, or at least to harvest, single domain ferroelectric nanoparticles is therefore of prime interest to many communities. The range of applications that may benefit from a readily available source of single ferroelectric domain nanoparticles is significant. In particular, a need has arisen for harvesting ferroelectric nanoparticles to obtain single domain ferroelectrics at a small nano-scale, such as <10 nm.

Unfortunately, due to this particle size and existing production methods, many nanoparticles have impaired ferroelectric properties compared with the source bulk material. As a result, uniformity and reproducibility in nanoparticle applications are lacking, particularly at smaller sizes, thereby negating the effectiveness of these particles in many applications. The impaired properties of the nanoparticles degrade their performance in many applications and render them useless for applications such as liquid crystal displays. It is, therefore, very desirable to have a method for selectively harvesting those nanoparticles that have the strongest spontaneous polarization and dipole moments from the plethora of non-ideal nanoparticles.

SUMMARY OF INVENTION

The disclosed methods provide a novel way to selectively harvest nanoparticles with desired ferroic properties and to improve the performance of liquid crystal devices and other materials through the use such harvested nanoparticles. The disclosed gas and liquid phase separation techniques use electric field gradients to selectively harvest ferroic nanoparticles with the strongest dipole moments from bulk nanoparticle preparations. The disclosed methods can selectively harvest ferroelectric and ferromagnetic nanoparticles, particularly single domain ferroic nanoparticles, that are spontaneously polarized with strong electric and/or magnetic dipole moments from a plethora of unpolarized or weakly polarized bulk nanoparticles. Also disclosed are applications for the use of such harvested nanoparticles in liquid crystal media, such as liquid crystal displays, ferromagnetic devices (i.e., hard drive), and other storage media devices.

Low concentrations of ferroic nanoparticles are subjected to very strong electric field gradients or electromagnetic field gradients such that any dipole-to-dipole interactions are minimized. Although a uniform field may be used to separate charged species, use of a nonuniform field gradient is necessary to impart a translative force to the dipoles of the ferroic nanoparticles. The nonuniform field gradient separates those nanoparticles with strong dipoles and charges from those with weak dipole or no charge. Electric or magnetic field gradients may be used to harvest nanoparticles according to the disclosed methods.

A method of harvesting nanoparticles comprises suspending the nanoparticles in an enclosed column. A nonuniform field gradient is applied to the column between an electrode and a ground plate, wherein nanoparticles having a strong dipole moment are attracted to the electrode and nanoparticles with a weak dipole or no dipole moment are attracted to the ground plate.

An apparatus for harvesting nanoparticles comprises an enclosed column for receiving a plurality of nanoparticles. An electrode positioned inside of the column. A ground plate is positioned along the column and separated from the electrode. A source of electrical or magnetic energy is connected to the electrode and creates a nonuniform field gradient within the column between the electrode and the ground plate.

Nanoparticles harvested according to the disclosed methods are useful in a wide range of applications and materials, such as liquid crystal materials. The harvested nanoparticles may also be used in isotropic or anisotropic materials, as well as in solid, liquid, or gas materials, and combinations of such materials to improve the performance and properties of those materials.

The performance of materials that use ferroic nanoparticles can be improved by using ferroic nanoparticles with strong dipole moments that are harvested according to the harvesting methods disclosed herein. The harvested ferroic nanoparticles added to the materials improves the performance of the materials as compared to the performance the materials have when conventional, unharvested ferroic nanoparticles are used.

DETAILED DESCRIPTION

Figure 1:
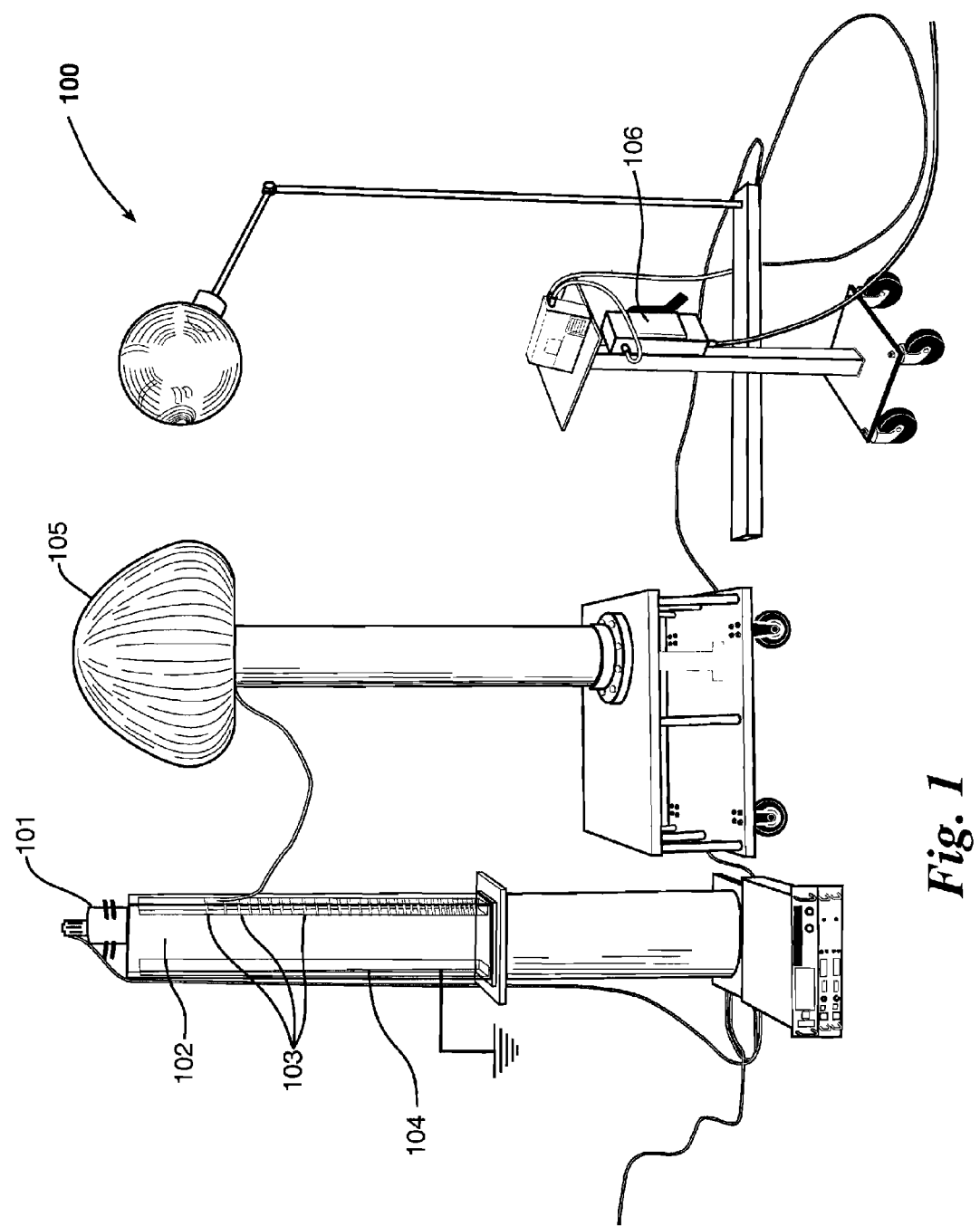
FIG. 1 discloses an apparatus for use in the gas phase separation method.
Figure 2:
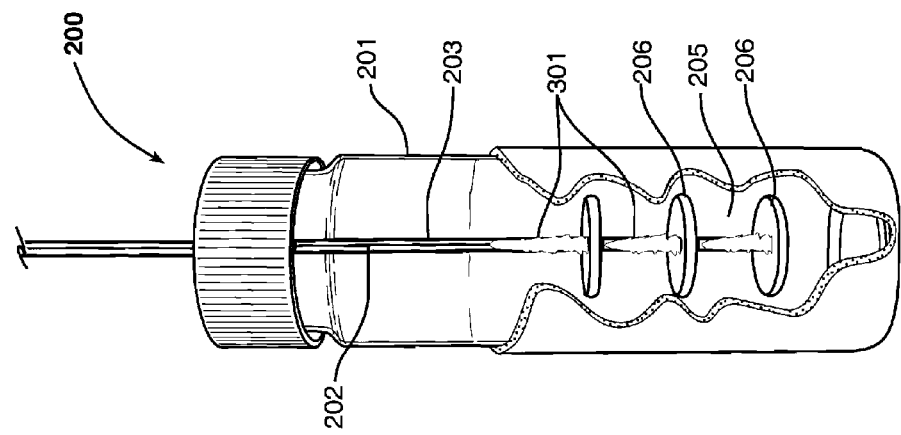
FIGS. 2 and 3 disclose an apparatus for use in the liquid phase separation method.
Figure 3:
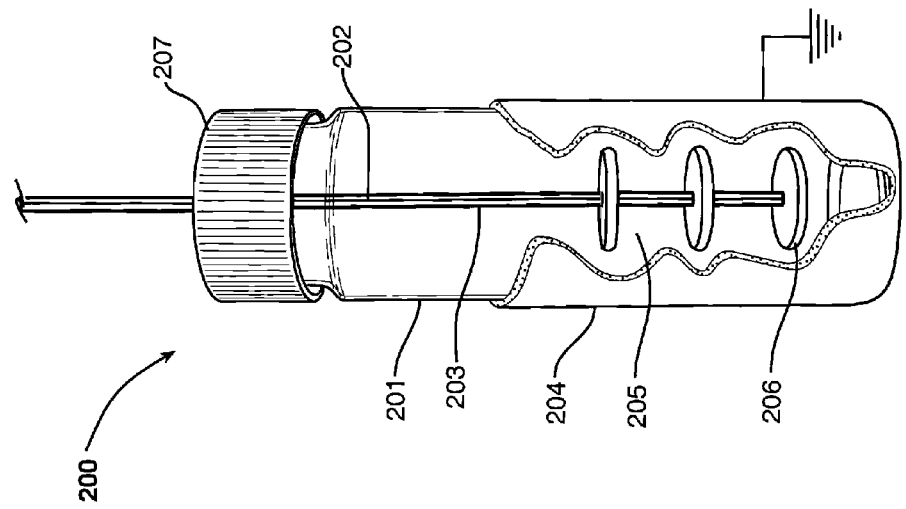

The nanoparticles disclosed herein typically have permanent spontaneous polarizations that may be difficult or impractical to reverse with an external field due to surface tension effects and other physiological properties of such nanoparticles. Whereas the term "ferroelectric" often refers to materials that possess a permanent, spontaneous electrical polarization whose direction usually can be easily altered or reversed through the application of an external field, the nanoparticles disclosed herein typically have a permanent spontaneous electrical polarization that cannot be easily reversed or altered. Because of this characteristic, the disclosed methods can be used to selectively harvest a wider variety of nanoparticles beyond those with ferroelectric composition or properties, including less expensive nanoparticles of glass, silicon, and other materials that have been given a permanent, spontaneous electrical polarization. Chemically-produced nanoparticles, such as those produced by sol-gel methods and the like, generally do not possess permanent spontaneous electrical polarizations because the chemical processes used to produce nanoparticles do not induce stress or strain into nanoparticles in the way that mechanical processes (such as ball-milling) do. Nanoparticles that are mechanically-derived, for example by ball-milling processes and the like, do possess permanent, spontaneous electrical polarizations whose net effectiveness can be improved through the harvesting methods disclosed herein. The nanoparticles harvested with the disclosed methods were produced by mechanical processes that gave them a permanent spontaneous electrical polarization. Fracturing nanoparticles by mechanical processes to induce a stress and/or strain surface tension produces nanoparticles with strong dipoles from a wide variety of materials, such as glass, silicon, and many other materials that are not considered to be ferroelectric materials. These nanoparticles comprise an entirely new class of potential "ferroelectric" materials within a larger new class of "ferroic" nanoparticles having a permanent, spontaneous electric dipole moment, magnetic dipole moment, or a combination thereof. If nanoparticles with permanent spontaneous electrical polarizations could be produced by chemical processes, the disclosed methods can be used to selectively harvest such nanoparticles.

The disclosed methods expose the nanoparticles to a field gradient. The dipole moments of the nanoparticles experience a translational force when exposed to the field gradient that produces a net translational force vector, F, such that $F=(p \cdot \nabla)E$ where p is the net average dipole moment of the nanoparticle and E is the electric field. For a given electric field strength and particle size, the translational force is proportional to the strength of the field gradient and the dipole moment of the nanoparticles. The translational force is maximized when the average dipole moment is greatest, which typically occurs when the nanoparticle has a single ferroelectric domain.

In the gas phase or air aerosol separation apparatus illustrated in FIG. 1, a particle separation apparatus 100 includes a turbine 101 for breaking up agglomerations of nanoparticles and admitting a semi-static aerosol of into a tall electrically-insulated particle separation column 102. The high speed airflow within the gas turbine 101 separates the agglomerated nanoparticles into mono-particulates through a combination of impact with the turbine blades and the housing walls, as discussed in more detail below in relation to FIG. 7. A small aperture in the base of the gas turbine gradually allows the mono-particulate nanoparticles to escape into the particle separation column 102 and create a quasi-static low concentration aerosol air suspension of mono-particulates. The particle separation column 102 may be an insulated acrylic tower having a vertical array of electrodes 103 that are disposed within the column 102 along one edge. A grounded metal plate 104 is positioned along a side of the column 102 opposite to the electrodes 103. The electrodes 103 are separated and electrically isolated from the grounded metal plate 104. The electrodes 103 may be spaced equidistant from one another or spaced progressively closer or farther apart along the side of the column 102. The electrodes 103 are connected to a high voltage electrical source 105, such as a Van de Graaff generator. The Van de Graaff generator 105 produces approximately 2.75 million volts to 3.0 million volts and can create a field gradient of 75,000 volts to 100,000 volts between the electrodes 103 and the grounded plate 104. A balance between corona emission from the electrodes 103 and the Van de Graaff generator 105 belt current maintains the applied potential at just below the dielectric breakdown threshold for the air gap between the electrodes 103 and the grounded plate 104. The electrodes 103 may be razor blades or other materials with a very sharp point or edge that provides a point source for the electrical field and creates a strong, nonuniform field gradient within the particle separation column 102 between the electrodes 103 and the grounded plate 104. Alternatively, the electrodes 103 may be connected to a source of electromagnetic energy (not shown) to create a nonuniform magnetic field gradient.

Figure 4:
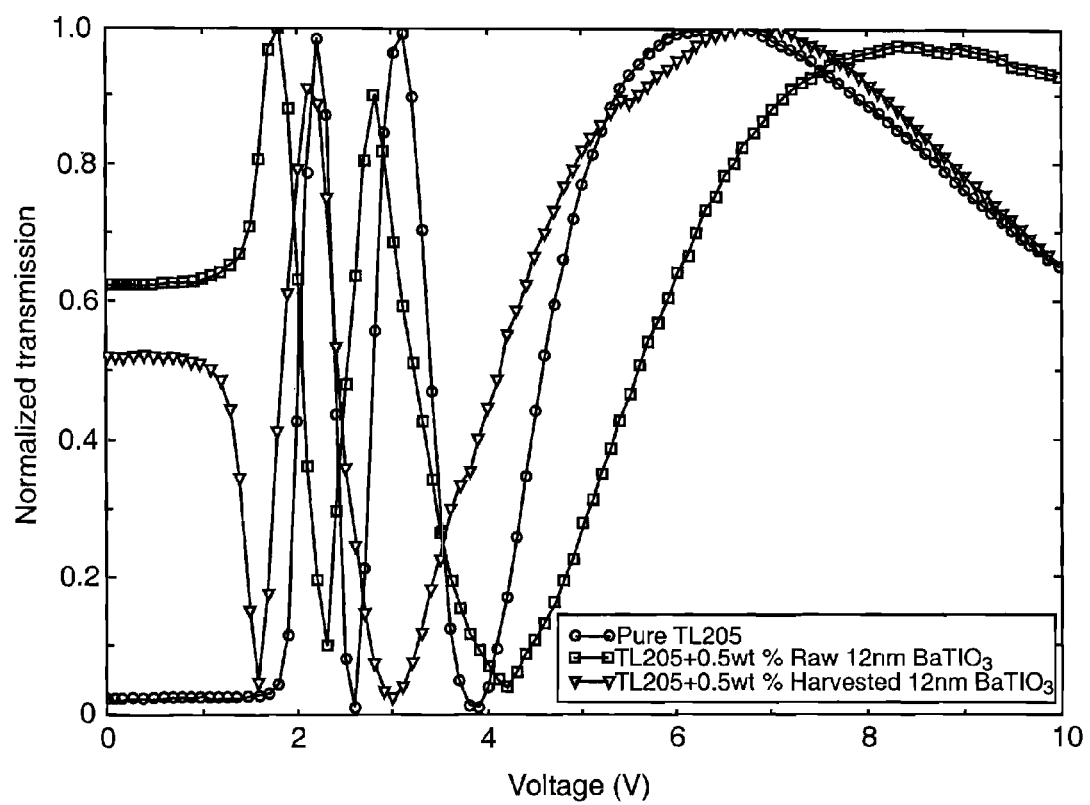
FIG. 4 shows improvements in Freedericksz transition characteristics in liquid crystal cells achieved through the use of selectively-harvested nanoparticles.

As nanoparticles are dispensed into the particle separation column 102 from the gas turbine 101, the nanoparticles remain generally suspended in a semi-static state within the column 102. When electric energy is applied to the electrodes 103 from the Van de Graaff generator 105, a non-uniform field gradient is formed between the electrodes 103 and the metal grounded plate 104. The field gradient is strongest at the electrodes 103, particularly when the electrodes 103 are point sources (such as razor blades and the like). Nanoparticles with the strongest electric dipoles are attracted to and collected on surfaces of the electrodes 103 while nanoparticles with weak dipoles or no charge are repelled by the electrodes 103 and attracted to and collected on the surface of the grounded plate 104 or the bottom of the column 102. Once the column 102 has been charged with nanoparticles and the electrical energy is supplied to the electrodes 103, separation and harvesting can take just a few seconds to complete. A remote control 106 can be used to regulate the voltage of the Van de Graaf generator 105, which provides a self-regulating voltage and, thereby, a constant field gradient within the column 102. Once the selected charge builds up at the electrodes 103, the Van de Graaf generator 105 maintains that charge and thereby maintains a constant field gradient between the electrodes 103 and the grounded plate 104. The nanoparticles that collect on the surfaces of the electrodes 103 can be harvested by any suitable means. For example, the electric current or magnetic charge can be removed from the electrodes 103 and the collected nanoparticles retrieved (or harvested) by shaking, ultrasonic energy, and the like. Nanoparticles have weaker dipole moments fall to the bottom of the column 102 to be collected, discarded, or recycled through another process to try to produce nanoparticles with stronger permanent dipole moments.

FIG. 2 illustrates a liquid column 200 for harvesting nanoparticles according to another embodiment of the present invention. The liquid phase separation includes a container 201 of liquid with a lid 207. The container 201 is made of a dielectric material such as glass. An inner electrode 202 is disposed axially within the container 201 and may comprise a thin wire electrode encased in a thin-walled, sealed glass capillary tube 203 or other similar dielectric material. A radially-disposed grounded outer electrode 204 is disposed around the container 201. The grounded electrode 204 encases the outer surface of the container 201. Because the container 201 comprises a dielectric material, such as glass, and the inner electrode 202 is surrounded by a tube 203, which may also be made of a dielectric material such as glass, the inner electrode 202 is electrically and mechanically separated from the outer electrode 204. It will be readily appreciated that a portion of the grounded outer electrode 204 has been removed from the column 200 in FIG. 2 to facilitate illustration of the internal components of the column 200. The container 201 is filled with a solvent fluid 205 that is nonionic and non-conducting (examples may include a non-polar solvent with a high resistivity, such as heptane or hexane). Electrically-insulating disks or shelves 206 are positioned along the capillary tube 203 surrounding the inner electrode 202 and comprise a dielectric material such as, polytetrafluoroethylene (PTFE). The shelves 206 are operable to catch the harvested nanoparticles that fall from the inner electrode 202 and the capillary tube 203 when the field gradient is removed.

In operation, low concentrations of nanoparticles are passed through the column 200 in a suspension of the fluid 205. Low concentrations of nanoparticle, such as concentrations of ≤0.08 weight %, are used to avoid flocculation on application of the electric field gradient that would otherwise impede the harvesting process. When electric energy is applied to the inner electrode 202, a nonuniform field gradient is formed between the inner electrode 202 and the outer grounded electrode 204. A DC potential of about 20,000 volts is applied to the inner electrode 202 for a period of time, which is dependent on the material being harvested (from seconds to hours). Nanoparticles with strong dipoles are attracted to and collect along the capillary tube 203 and inner electrode 202, shown as accumulated nanoparticles 301 in FIG. 3. When the electric field gradient is turned off, the nanoparticles of the accumulation 301 fall away from the capillary tube 203 and are collected on the upper surfaces of the shelves 206. Uncharged nanoparticles and nanoparticles with weak dipoles collect along an inner surface of the container 201 that is adjacent to the grounded outer electrode 204. When the electric field gradient is turned off, the uncharged nanoparticles and weak dipole nanoparticles fall to the bottom of the container 201 to be collected, discarded, or returned for further processing to produce nanoparticles with stronger dipole moments. Alternatively, the inner electrode 202 may be connected to a source of electromagnetic energy that is configured to create a nonuniform magnetic field gradient, if desired.

Gas phase separation (FIG. 1) provides a faster means of separating and selectively harvesting nanoparticles than liquid phase separation (FIGS. 2 and 3). The gas phase separation of FIG. 1 can separate grams or kilograms of nanoparticles with strong dipoles from nanoparticles having weak or no dipole moment in seconds, as compared to liquid phase separation of FIGS. 2 and 3 that may take 30-60 minutes per preparation to separate a few milligrams of nanoparticles (e.g., $BaTiO_3$). Gas phase separation can be used on larger, commercial quantities of nanoparticles but requires use of dried nanoparticle preparations. Liquid phase separation can be used when drying nanoparticle suspensions is impractical and can be better suited to small-scale laboratory testing where nanoparticles are taken directly from the liquid dispersion used in the mechanical grinding fabrication process. Both methods may be enhanced by application of optical, acoustic, or thermal excitation of the nanoparticles for materials that have photovoltaic, piezoelectric, or pyroelectric properties, wherein application of excitation generates stronger dipole moments in the nanoparticles.

The disclosed methods can be used to selectively harvest single domain ferroelectric nanoparticles ranging in size from about 0.5 nm to about 100 nm. In one example, $BaTiO_3$ nanoparticles as small as 9 nm were selectively harvested from a plethora of nanoparticles produced by mechanical grinding. High resolution TEM images (not shown) demonstrate the uni-domain molecular structure of the nanoparticles and reveal compressive and tensile surface strains, which are attributed to the preservation of ferroelectric behavior in these particles. The disclosed methods can also be used to harvest multi-domain ferroic nanoparticles.

The selectively harvested nanoparticles provide a variety of advantages and positive benefits in many applications. Among the most beneficial properties is a reduction of the Freedericksz transition voltage for a given liquid crystal medium that has been doped with low or very low concentrations of harvested nanoparticles having strong dipoles. Doping the liquid crystal medium with nanoparticles have strong dipoles reduces the electric field required to change the local alignment of the liquid crystal molecules within devices, thereby saving substantial electrical power in consumer products and similar devices containing liquid crystals. In addition, the matrix of nanoparticles formed within such devices creates an internal power source that can maintain the liquid crystals in a desired configuration and orientation, even when power has been cut off from the device. As shown in FIG. 4, the harvested nanoparticles improve the Freedericksz transition characteristic in liquid crystal cells, such as a liquid crystal TL205 material (a proprietary composition from EMerck Co. including a mixture of cyclohexane-fluorinated biphenyls and fluorinated terphenyls with aliphatic chains containing 2-5 carbons). Transition voltage was tested in a pure TL205 material and a TL205 material to which was added 0.5% by weight of raw 12 nm $BaTiO_3$ material in a raw state without any selective harvesting. Finally, the transition voltage was tested in a TL205 material to which was added 0.5% by weight of a 12 nm $BaTiO_3$ material that was selectively harvested so that all of the 12 nm $BaTiO_3$ material had a strong dipole moment and charge. The Freedericksz transition voltage was approximately 1.8 Volts for a pure TL205 material. The transition voltage was reduced to about 1.4 volts through the use of conventional, unharvested 12 nm $BaTiO_3$ nanoparticles. The transition voltage was further reduced to about 1.0 Volt through the addition of 12 nm $BaTiO_3$ nanoparticles that were selectively harvested according to the disclosed methods.

Figure 5:
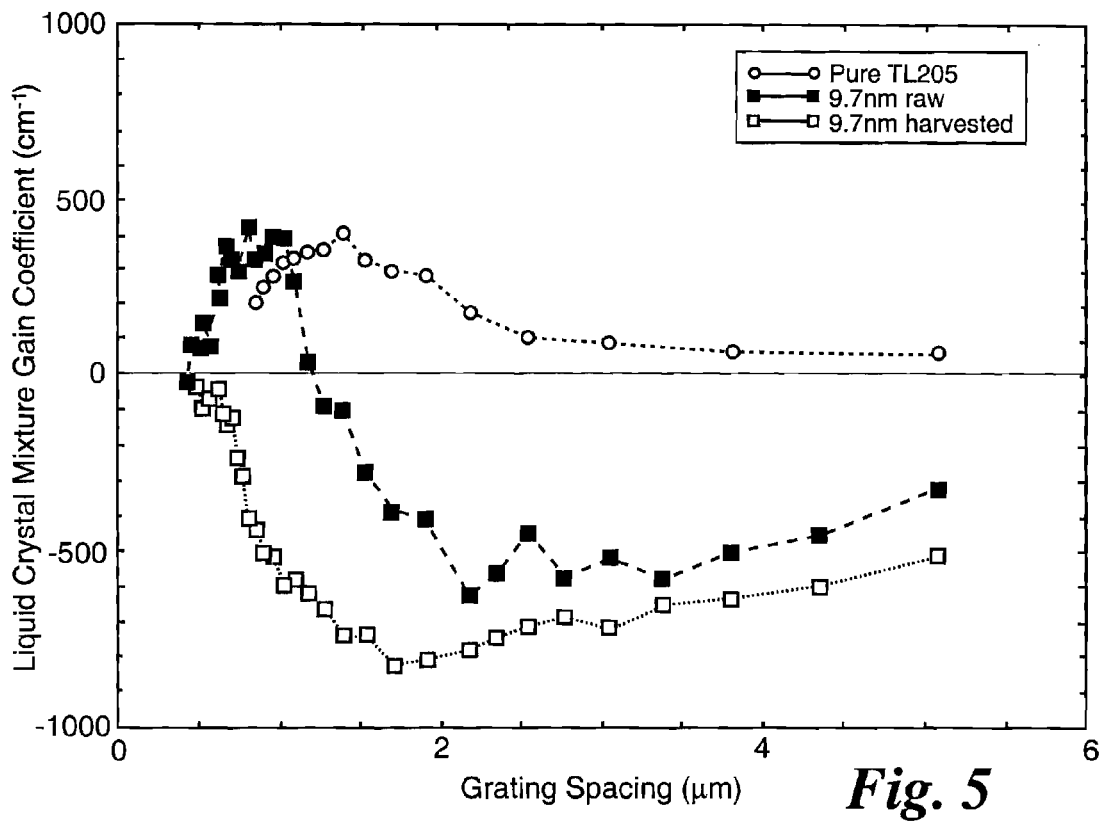
FIGS. 5 and 6 show the increases in optical gain coefficients that are realized with the use of selectively-harvested nanoparticles.
Figure 6:
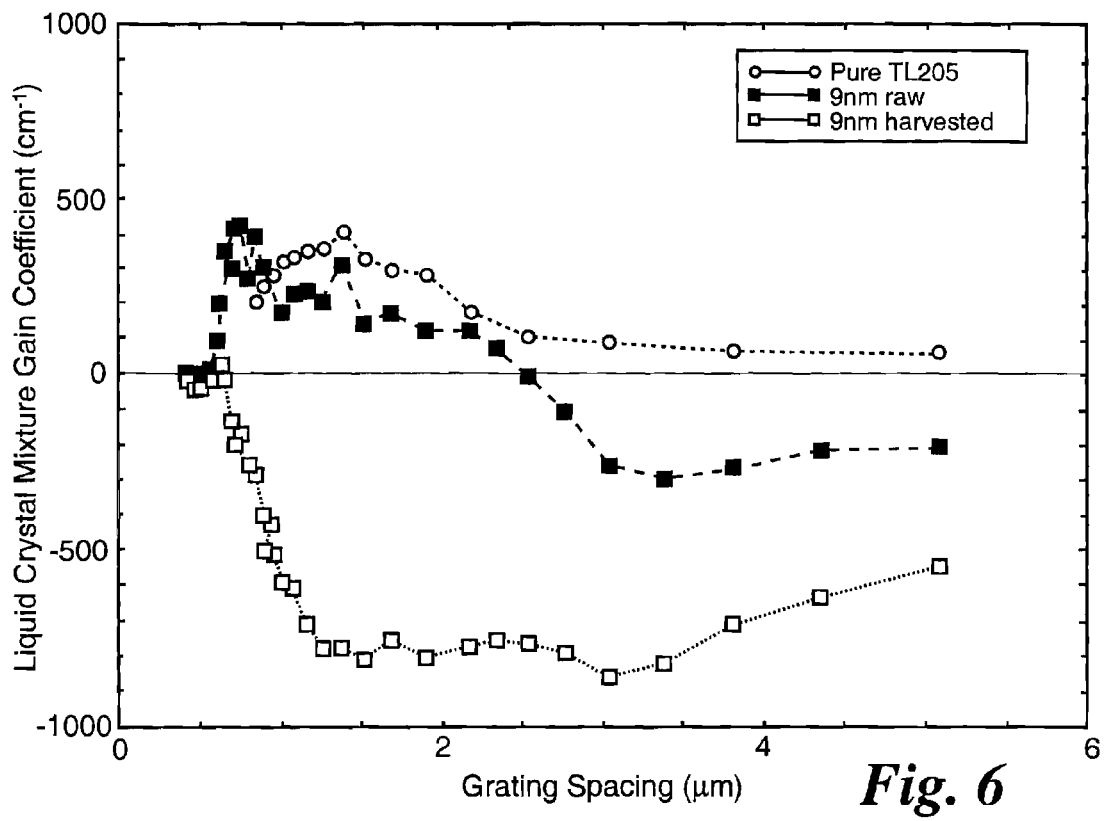

Use of nanoparticles selectively harvested according to the disclosed methods also provides dramatic improvements in hybrid photorefractive devices. FIGS. 5 and 6 show increased optical gain coefficients that are realized with the use of selectively-harvested nanoparticles. Benefits can vary considerably with the fundamental particle size of the nanoparticles. FIGS. 5 and 6 show the dramatic improvements that can be achieved when optical devices are constructed with harvested nanoparticles. Among the greatest improvements is the dramatic increase in optical gain coefficient for small grating spacings, which corresponds to an increase in the optical resolution of photorefractive holograms.

Figure 7:
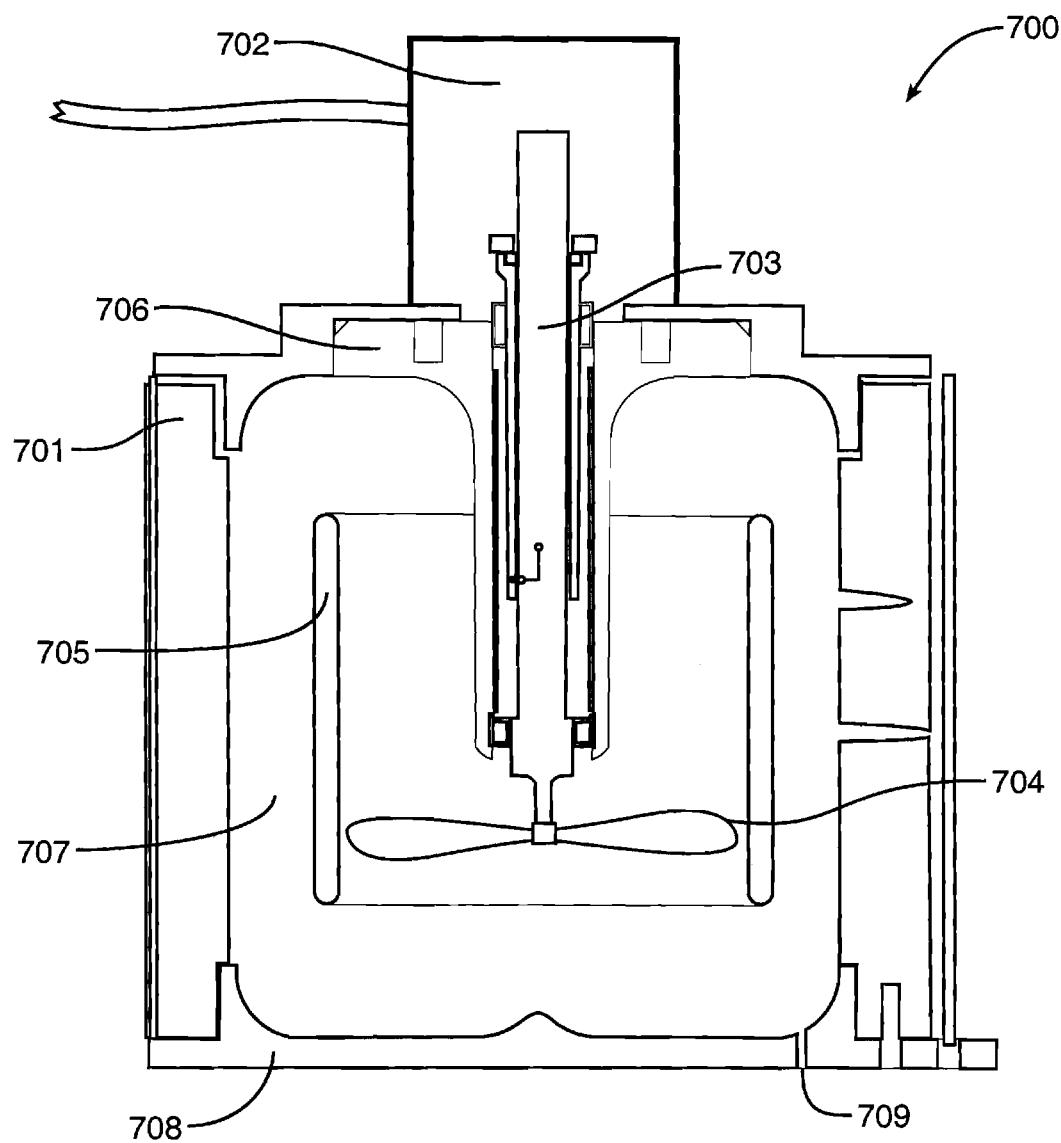
FIG. 7 discloses a cross-sectional view of a turbine for use in the gas separation method.

According to some embodiments, the small size and the intrinsic dipole moment of the nanoparticles may cause agglomeration and clumping in gas separation making it very difficult to create a mono-particulate aerosol for the separation column 102. To overcome this problem, an externally-driven, 60,000 rpm concentric turbine 101 (FIG. 1) was used to circulate of nanoparticle material in a closed toroidal path. As shown in greater detail in FIG. 7, one type of such turbine for use in the gas phase separation is a high speed concentric gas turbine 700 having a housing 701, a motor 702, a drive shaft 703, an impeller with turbine blades 704, an inner tube 705, a bearing housing 706, a chamber 707, and a base cap 708 with an aperture 709. The turbine 700 may be a transonic turbine that separates agglomerated nanoparticles into a mono-particulate aerosol dispersion that can be dispensed into the column where it is subjected to the nonuniform field gradient as described above. The high speed airflow within the gas turbine 700 separates agglomerated nanoparticles into mono-particulates through a combination of impact with the turbine blades 704 and the inner walls of the housing 701. The small aperture 709 in the base cap 708 allows the mono-particulate nanoparticles to escape from the turbine 700 to the particle separation column 102 (FIG. 1) to create a quasi-static low concentration aerosol air suspension of mono-particulates.

Other suitable methods for separating agglomerated nanoparticles prior to selectively harvesting with the gas phase separation include ultrasonic dispersion, dry aerosol sprays, electrostatic spray, and a wet aerosol spray. With ultrasonic dispersion, a transducer can be used to shake clumped nanoparticles apart as the nanoparticles are emitted to the particle separation tower 102 (FIG. 1) and before the nanoparticles are subjected to an electric or magnetic field gradient. A dry aerosol spray can be used to spray a quantity of mono-particulate nanoparticles into the static air column (within the particle separation tower 102 of FIG. 1). After sufficient time when the aerosol suspension stops swirling around and become static, a field gradient is applied to the aerosol suspension to separate nanoparticles with strong dipoles from those nanoparticles having a weak or no dipole moment. An electrostatic spray, either of dry powder or of a liquid suspension, may be dispensed into the static air column (within the particle separation tower 102 of FIG. 1). After sufficient time when the aerosol suspension stops swirling around and become static, the field gradient is applied to separate nanoparticles with strong dipoles from nanoparticles having weak or no dipole moment. The liquid variant of this technique relies on evaporation of the solvent in the air column before the field gradient is applied. The solvent is purely a medium to assist transportation and dispersion of the nanoparticles in the air column. A wet aerosol spray also may be used. This method combines the electrostatic spray and dry aerosol spray methods described above.

Other methods for harvesting graded collections of the nanoparticles according to dipole strength may be used. For example, gas phase separation may be performed in a vacuum with a non-uniform electric or magnetic field gradient as disclosed herein. Use of a vacuum eliminates the effects of Brownian motion in the air column 102 (FIG. 1), such that a threshold field gradient is no longer needed to overcome Brownian motion mixing. This method is beneficial when it is desired to segregate collected nanoparticles according to dipole strength. In the absence of Brownian motion and in the presence of a vacuum, the nanoparticles will freefall through the column 102 (FIG. 1). If a non-uniform field gradient is applied to the column 102 (FIG. 1) during this process, the nanoparticles with stronger dipole moments will be collected at a position that is higher in the column 102 (FIG. 1) while nanoparticles having weaker dipole moments will be collected at a position that is lower on the column 102 (FIG. 1).

Although disclosed methods have been illustrated with electric DC field gradients, for certain materials it may prove advantageous to use an oscillatory field gradient, such as one created by a true AC electric source or an AC source created with a DC bias, such as a repetitively pulsed DC source. The oscillatory waveform created by such field gradients may be shaped as appropriate for the material, for example, sinusoidal, triangular, square wave, and the like.

While the disclosed methods were illustrated with electric field gradients, magnetically polarized nanoparticles may be harvested by simply replacing the electrical field gradient with a magnetic field gradient. Moreover, the use of either an electric or a magnetic field gradient according to the disclosed methods may be used to selectively harvest multi-ferroic nanoparticles that possess a permanent electrical dipole moment and/or a permanent magnetic dipole moment, respectively.

Other methods for producing a magnetic or electric field gradient include the use of sharp point projections that may comprise sharp edges, points, wires, or textured surfaces. The points may be directly coupled to a voltage or magnetic field source, or the points may be indirectly coupled, for example, by resistive coupling, capacitive coupling, or inductive coupling, or via materials with varying impedance or permeability. Both the gas and liquid phase separation methods may use unshielded, bare electrodes that provide direct electrical and magnetic coupling as well as field coupling, or the methods may use insulated electrodes so there is no direct electrical or magnetic contact with the electrode material (i.e., pure field coupling). For the liquid phase separation method, the high voltage central electrode may comprise a wire, a corrugated wire, a helix, a wound structure, a mesh, a textured surface, a sharp edge, or a plurality or combination of these structures. As used herein, the term electrode is used concisely as a means of inferring either an electrical electrode or a magnetic electrode.

As a result of the disclosed harvesting methods, or combinations therein, harvesting high percentages of nanoparticles having electric and/or magnetic dipole moments at or exceeding a desired level is maximized. The disclosed methods or combinations thereof can be used to harvest ferroic nanoparticles with the strongest dipoles from ferroic nanoparticles with weak or no dipole moments. The harvested ferroic nanoparticles can be used in a wide variety of applications that take advantage of the inherent, permanent dipole. Reproducibility of devices fabricated using such harvested ferroelectric or ferromagnetic nanoparticles is maximized because the disclosed methods are able to harvest ferroic nanoparticles with the strongest dipole moments from among bulk nanoparticle materials.

Ferroic nanoparticles harvested according to the disclosed methods may be used in a wide range of materials including gases, liquids, and solids. For gases, the harvested ferroic nanoparticles would have to be sufficiently small so Brownian motion alone could keep the nanoparticles permanently in suspension in the gas medium. Application of a uniform electric field would enable the nanoparticles to be aligned in the gas medium to generate an anisotropic gas medium. Without the field, the same mixture could be made isotropic. For solid mediums, the harvested ferroic nanoparticles could be of any desirable size, added either by melting the solid and re-solidifying, or by solidification through some kind of chemical reaction, such as polymerization or crystallization. The application of a uniform field during the solidification process may generate an anisotropic solid. Natural dipole-dipole interactions between adjacent nanoparticles may naturally create an anisotropic medium (possibly with local domain orientations).

Nanoparticles harvested by the disclosed methods may be used in other mediums that are sensitive to the presence of ferroic materials. Use of such harvested ferroic nanoparticles in such materials and mediums improves the performance of the materials and mediums as compared to materials incorporating conventional unharvested nanoparticles and unharvested ferroic nanoparticles. For example, harvested ferroic nanoparticles may be used in applications in which a liquid crystal material is used in combination with non-liquid crystal materials, such as holographic polymer-dispersed liquid crystals (HPDLC), polymer-dispersed liquid crystals (PDLL), POLYCRIPS, polymers, photoconductive/photovoltaic/photorefractive polymers, and ordered or unordered composite media. Liquid crystal media in which harvested ferroic nanoparticles can be used to improve performance over the use of conventional unharvested nanoparticles include isotropic, nematic, chiral, smectic, ferroeletric, discotic, lyotropic, or crystalline media. The liquid crystal media or the composite media may be doped with optically or magnetically active materials, such as organics dyes, azo dyes, azo liquid crystals, trans-cis isomers, oligimers, cavitands, cavitand ligands, rotaxanes, catananes, metal chelates, magnetic compounds, paramagnetic compounds, super paramagnetic compounds, superconducting materials, and metamaterials (materials in which epsilon and mu may be independently controlled to generate, for example, negative refractive indices). Moreover, the medium may be isotropic or anisotropic, or a plurality of such materials such as liquids, solids, and the like. All of these materials and mediums show improved performance from the use of harvested ferroic nanoparticles over the use of materials and media incorporating conventional unharvested nanoparticles.

The harvesting methods described herein allow doping of liquid crystal photorefractive hybrids with harvested ferroic nanoparticles of a diameter which have hitherto been too small and inconsistent in quality to generate significant ferroelectric dipole moments. The inclusion of small ferroic nanoparticles with strong dipole moments (obtained through harvesting) enables high optical gain to be achieved with low scatter and minimal liquid crystal defect structures. The gain and optical quality have both been therefore improved through the harvesting process.

The combination of particles generated by mechanical processes, such as ball-milling and other methods that induce stress and strain in the nanoparticles, together with the use of the field gradient harvesting methods disclosed herein, generates high concentrations of single domain ferroelectric nanoparticles with intrinsically rough or shaped surfaces. Environmental changes affect bulk dielectric permittivity and/or bulk dielectric permeability. Changes to bulk dielectric permittivity and/or bulk dielectric permeability enable environmentally variable control of electrical and magnetic stored energy. For example, a capacitor may be realized in which the capacitance is sensitive to pressure, temperature, light, electric and/or magnetic fields, wherein energy is either absorbed or liberated in electrical or magnetic form when changes occur to pressure, temperature, light, electric and/or magnetic fields impinging on the device. Moreover, the permittivity or permeability of a capacitor or magnetic device used for energy storage can be altered through environmental changes. For example, a capacitor with a pressure dependent dielectric permittivity may be used under stress to store a given quantity of energy. On release of the stress, a sudden reduction in the capacitor permittivity causes immediate conversion from a low voltage high capacitance state to a high voltage low capacitance state with equivalent energy. Such a device may be used to generate significant voltage amplitudes from modest low voltage storage or for energy harvesting applications.

Use of ferroelectric nanoparticles harvested according to the disclosed methods provides significant advantages over current hybrid photorefractive devices that use bulk nanoparticles with no dipole moment or dipole moments of weak and varying strength. It also dramatically lowers the power requirements for many liquid crystal-based devices. In addition, the use of the harvested nanoparticles of $BaTiO_3$ in symmetric liquid crystal cells creates devices that are sensitive to the sign of the applied electric field. Inclusion of harvested nanoparticles with strong dipole moments also creates a built-in, internal biasing field that may aid power efficiency savings in liquid crystal devices and allow liquid crystal media to incorporate electrical and optical diode-like characteristics within the device.

The disclosed methods also can provide quality control for processes that produce nanoparticles by providing a means to evaluate the effectiveness and yield of such processes in producing nanoparticles with strong dipoles from bulk nanoparticle materials. Moreover, use of the disclosed methods produces yields of nearly 100% of ferroelectric nanoparticles of strong permanent dipoles of required properties. As such, the methods can be used to harvest ferroelectric nanoparticles that are produced by any method, even methods that produce such nanoparticles in very low yields because the disclosed methods can process those bulk materials to harvest 100% or nearly 100 ferroelectric nanoparticles of the requisite dipole moments and other properties from such bulk materials and processes.

The foregoing disclosure has been presented for purposes of illustration and description and is not intended to be exhaustive or to limit the disclosure to the devices, systems, methods, and forms disclosed herein. Persons skilled in the art will realize and appreciate that many modifications and variations are possible in light of the above teaching. The disclosed methods and associated apparatuses and their variations were described to best explain the principles of the invention and its practical applications to thereby enable other persons skilled in the art to make and use the invention in its various forms and with its various modifications as are suited to the particular uses contemplated. The scope of the invention is to be defined by the following claims.

What is claimed is:

1. A method of harvesting nanoparticles having strong dipole moments, the method comprising:
    suspending a plurality of nanoparticles in an enclosed column, the column having an electrode and a ground plate spaced away from the electrode;
    applying a nonuniform field gradient to the column between the electrode and the ground plate such that nanoparticles of the plurality having a strong dipole moment are attracted to the electrode and nanoparticles of the plurality having a weak dipole moment or no dipole moment are attracted to the ground plate; and
    collecting nanoparticles of the plurality having the strong dipole moment from the electrode.

2. The method of claim 1, wherein the nonuniform field gradient is an electric field gradient or a magnetic field gradient.

3. The method of claim 1, wherein the electrode comprises a plurality of electrodes positioned along a first side of the column, each electrode of the plurality being spaced apart at progressively greater distances along a length of the first side of the column, and the ground plate is positioned proximate a second side of the column that opposes the first side of the column.

4. The method of claim 1, wherein the electrode is coaxially disposed within the column and the ground plate surrounds an outer surface of the column.

5. The method of claim 1, wherein the electrode comprises a material having a sharp edge.

6. The method of claim 1, wherein the column encloses includes a gas, a dielectric liquid, or a vacuum.

7. The method of claim 6, wherein the dielectric liquid is heptane or hexane.

8. The method of claim 1, further comprising:
    removing the nonuniform field gradient from the column before collecting nanoparticles of the plurality having the strong dipole moment from the electrode;
    removing nanoparticles of the plurality having the weak dipole moment or no dipole moment from the ground plate.

9. The method of claim 1, further comprising:
    de-agglomerating the plurality of nanoparticles before suspending the plurality of nanoparticles in the column.

10. The method of claim 9, wherein de-agglomerating the plurality of nanoparticles includes operation of a turbine or an ultrasonic transducer.

11. The method of claim 1, further comprising:
    dispensing the plurality of nanoparticles to the column by a dry aerosol spray, an electrostatic spray, or a wet aerosol spray.

12. The method of claim 1, further comprising:
    drawing a vacuum on the column.

13. The method of claim 1, further comprising:
    strain- or stress-inducing a dipole moment onto the nanoparticles of the plurality before suspending the plurality of nanoparticles.

14. The method of claim 1, wherein applying the nonuniform field gradient includes operating a Van de Graaff generator.

15. The method of claim 1, further comprising:
    forming nanoparticles of the plurality by a ball-milling process before suspending the plurality of nanoparticles in the enclosed column.

16. The method of claim 1, wherein nanoparticles of the plurality comprise barium titanate ($BaTiO_3$), lithium niobate ($LiNbO_3$), potassium niobate ($KNbO_3$), strontium barium niobate (SBN), potassium sodium strontium barium niobate (KNSBN), tin hypothiodiphosphate (SPS), gallium arsenide (GaAs), indium phosphide (InP), silicon, or glass and have a size ranging from about 0.5 nm to about 100 nm.

17. The method of claim 8, further comprising:
    processing the removed nanoparticles of the plurality having the weak dipole moment or no dipole moment to induce a dipole moment thereto;
    suspending the reprocessed nanoparticles in the enclosed column;
    applying the nonuniform field gradient to the column; and
    further collecting nanoparticles of the plurality having the strong dipole moment from the electrode.

18. A method of improving the performance of a material, the method comprising:
    harvesting nanoparticles having a strong dipole moment according to the method of claim 1; and
    doping the material with the harvested nanoparticles.

19. The method of claim 18, wherein the harvested nanoparticles comprise ferroelectric nanoparticles, ferromagnetic nanoparticles, or a combination thereof.

20. The method of claim 18, wherein the material is a liquid crystal medium.

21. The method of claim 20, wherein an optical gain and a liquid crystal defect of the liquid crystal medium are higher and lower, respectively, for the liquid crystal medium doped with the harvested nanoparticles as compared to the liquid crystal medium doped with nanoparticles that are not harvested according to the method of claim 1.

22. The method of claim 20, wherein a Freedericksz transition voltage of the liquid crystal medium doped with the harvested nanoparticles is increased, a nematic-isotropic phase transition temperature of the liquid crystal medium doped with the harvest nanoparticles is increased, a speed of response of the liquid crystal medium doped with the harvested nanoparticles is improved, a frequency operation for the liquid crystal medium doped with the harvested nanoparticles is higher, a current leakage in the liquid crystal medium doped with the harvested nanoparticles is reduced, and a field of view of the liquid crystal medium doped with the harvested nanoparticles is increased as compared to the liquid crystal medium doped with nanoparticles that are not harvested according to the method of claim 1.

23. The method of claim 18, wherein the harvested nanoparticles are single domain nanoparticles.

24. The method of claim 18, wherein the harvested nanoparticles have a size of about 0.5 nm to 100 nm and comprise barium titanate ($BaTiO_3$), lithium niobate ($LiNbO_3$), potassium niobate ($KNbO_3$), strontium barium niobate (SBN), potassium sodium strontium barium niobate (KNSBN), tin hypothiodiphosphate (SPS), gallium arsenide (GaAs), indium phosphide (InP), silicon, glass, or other material with a permanent electric and/or magnetic dipole moment.

25. The method of claim 18, wherein the material is a capacitor in which the capacitance is sensitive to pressure, temperature, light, electric and/or magnetic fields such that energy is either absorbed or liberated in electrical or magnetic form when changes occur to pressure, temperature, light, electric and/or magnetic fields impinging on the device.

26. The method of claim 18 wherein the harvested nanoparticles may be incorporated in a plethora of media, including isotropic or anisotropic materials, or a plurality of such materials including liquids, solids, hybrids, and gases.

27. An apparatus for harvesting nanoparticles having permanent dipole moments, comprising:
    an enclosed column for receiving a plurality of nanoparticles;
    an electrode positioned inside and coaxial with the column;
    a plurality of shelves coupled to the electrode, the shelves of the plurality spaced along a lengthwise central axis of the electrode;
    a ground plate operably coupled to the column and separated from and space away from the electrode; and
    a source operably coupled to the electrode and configured to generate an electrical or magnetic energy such that a nonuniform field gradient is generated within the column between the electrode and the ground plate,
    wherein nanoparticles of the plurality segregated along the electrode during generation of the nonuniform field gradient are collected by a proximate one of the plurality of shelves when the nonuniform field gradient is terminated.

28. The apparatus of claim 27 wherein the electrode comprises a plurality of electrodes positioned along the lengthwise central axis.

29. The apparatus of claim 27, wherein the column encloses a gas or a dielectric fluid.

30. The apparatus of claim 27, wherein the column encloses a vacuum so that nanoparticles of the plurality are segregated according to the strength of dipole moments.

31. The apparatus of claim 28, wherein electrodes of the plurality are spaced apart at progressively greater distances along the lengthwise central axis.

32. The apparatus of claim 27, wherein the ground plate surrounds an outer surface of the column.

33. The apparatus of claim 28, wherein electrodes of the plurality comprise a material having a sharp edge.

34. The apparatus of claim 27, further comprising:
    a nanoparticle source operably coupled to the column and configured to dispense the plurality of nanoparticles thereto.

35. The apparatus of claim 29, wherein the column encloses the dielectric liquid and a dielectric material encloses the electrode such that the electrode is isolated from the dielectric liquid.

36. The apparatus of claim 27, wherein the electrode comprises a wire, a corrugated wire, a helix, a wound structure, a mesh, a textured surface, a sharp edge, or a combination thereof.

37. The apparatus of claim 27, wherein the source is a Van de Graaff generator.

38. The apparatus of claim 27, wherein the electrode is directly coupled to the source.

39. The apparatus of claim 34, wherein the nanoparticle source includes a gas turbine, a dry aerosol sprayer, an electrostatic sprayer, or a wet aerosol sprayer.

40. The apparatus of claim of claim 27, wherein the electrode is indirectly coupled to the source, the indirect coupling comprising a resistive coupling, a capacitive coupling, an inductive coupling, an impedance couple, or permeability coupling.

41. A method of harvesting strong dipole moment nanoparticles from a plurality of nanoparticles, the method comprising:
    dispensing the plurality of nanoparticles into an enclosed column;
    applying a nonuniform field gradient along a first dimension of the column so as to segregate nanoparticles of the plurality along the first dimension and according to a dipole moment;
    removing the nonuniform field; and
    collecting nanoparticles of the plurality along the first dimension corresponding to a strong dipole moment.

* * * * *